(12) United States Patent  
Streitberger et al.

(10) Patent No.: US 7,387,768 B2
(45) Date of Patent: Jun. 17, 2008

(54) METHOD FOR PURIFYING GASES

(75) Inventors: Horst Streitberger, Altoetting (DE); Oliver Pfueller, Sulzbach (DE); Achim Stankowiak, Altoetting (DE); Alexander Snell, Altoetting (DE); Norbert Mollekopf, Dresden (DE); Hans-Dieter Mueller, Dresden (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 373 days.

(21) Appl. No.: 11/217,758

(22) Filed: Sep. 1, 2005

(65) Prior Publication Data

US 2006/0045830 A1    Mar. 2, 2006

(30) Foreign Application Priority Data

Sep. 2, 2004    (DE) ..................... 10 2004 042 418

(51) Int. Cl.
*B01D 53/40* (2006.01)
*C09K 3/00* (2006.01)

(52) U.S. Cl. ................... 423/228; 423/242.7; 423/236; 423/245.1; 564/503; 564/504; 252/182.12; 252/373

(58) Field of Classification Search ............... 564/503, 564/504; 252/182.12, 373; 423/228, 242.7, 423/236, 245.1
See application file for complete search history.

(56) References Cited

U.S. PATENT DOCUMENTS

| | | | |
|---|---|---|---|
| 2,712,978 A * | 7/1955 | Blohm et al. ................ 423/228 |
| 3,440,029 A * | 4/1969 | Little et al. .................. 44/424 |
| 4,057,403 A * | 11/1977 | Valdes ......................... 95/181 |
| 4,368,059 A | 1/1983 | Doerges |
| 4,556,546 A | 12/1985 | Burgoyne |
| 5,264,006 A * | 11/1993 | Schilowitz et al. ........... 44/434 |
| 6,004,923 A | 12/1999 | Oftring |
| 6,277,345 B1 | 8/2001 | Stankowiak |

FOREIGN PATENT DOCUMENTS

| DE | 26 01717 | 7/1977 |
|---|---|---|
| DE | 195 48 010 A1 * | 5/1996 |
| DE | 195 48 009 A1 | 6/1996 |
| DE | 01217469 | 9/2003 |
| EP | 0 289 951 A2 * | 11/1988 |
| GB | 934636 | 8/1963 |

OTHER PUBLICATIONS

English Absrtact of DE 195 48 009A1, Pub Jun. 13, 1996.

German Patent Office -Office Action issued Jul. 15, 2005 related to corresponding application DE 10 2004 042 418.7
European Patent Office -Search Report and Analysis issued Aug. 12, 2005 related to corresponding application EP 05017819.
English Language Abstract of DE 10217469, Sep. 25, 2003.
English Language Translation of DE2601717A, Jul. 21, 1977.

* cited by examiner

*Primary Examiner*—Timothy C Vanoy
(74) *Attorney, Agent, or Firm*—Richard P. Silverman

(57) ABSTRACT

The invention relates to the use of an absorption liquid for purifying gases from gaseous acidic contaminants, the absorption liquid comprising
A) 0.1 to 100% by weight of one or more amines of the formula I

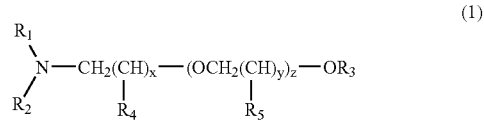

where
$R_1$ is H, $C_1$-$C_6$-alkyl, an aromatic radical having 6 to 18 carbon atoms or a radical of the formula 2

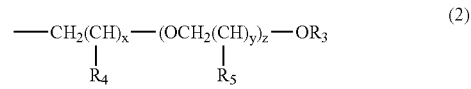

$R_2$ is H, $C_1$-$C_6$-alkyl, an aromatic radical having 6 to 18 carbon atoms or a radical of the formula 3

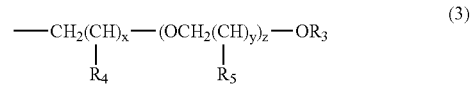

$R_3$ is $C_1$-$C_6$-alkyl or an aromatic radical having 6 to 18 carbon atoms
$R_4$ is H or $CH_3$
$R_5$ is H or $CH_3$
x is a number from 0 to 3
y is a number from 0 to 3
z is an integer between 1 and 30,
and also, if appropriate,
B) 0 to 99.9% by weight of water,
and/or
C) 0 to 99.9% by weight of any desired solvent.

16 Claims, No Drawings

METHOD FOR PURIFYING GASES

The present invention relates to the use of polyalkylene glycol ether amines as main constituent or minor constituent of absorption liquids for removing contaminating components from gas mixtures of any origin (termed crude gases for short).

In energy technology and in the chemical industry, use is made of gas mixtures of the most varied origin such as natural gas or synthesis gas for producing heating gases, and for producing chemical products. The acid-forming contaminants present therein, such as $CO_2$, HCl, HCN, $H_2S$, $SO_2$, COS, $CS_2$, lower mercaptans and thioethers present therein are in part toxic and environmentally harmful, or they impede the production sequence owing to solids precipitation or poisoning of the catalyst. They must therefore be removed from the crude gas. The plant operators are required by law to heed official provisions which limit sulfur ejection and the emission of other toxic constituents, and currently reducing the ejection of carbon dioxide is also increasingly gaining importance.

The most widespread purification method is based on absorption, in which the good solubility of the contaminating components in certain liquids (scrubbing agents) is utilized for scrubbing, while the slightly soluble useful gases remain in the gas stream. The absorption process is carried out technically in a gas scrubber. The principle of its structure is determined by the reuse of the scrubbing medium by regeneration, the scrubbing medium being recirculated so that the gases to be scrubbed out are loaded in the actual absorber, and the dissolved gases are expelled in the desorber. Desorption is based on the decrease in solubility with increasing temperature or, if the chemical conversions only take place in part, with decreasing partial pressure as a result of pressure expansion or stripping. In the prior art, methods for removing such contaminants are described extensively, for example in A. L. Kohl, F. C. Riesenfeld: "Gas Purification", 4th ed., Gulf Publishing Co., Houston/Tex. (1985) and S. A Newman (Editor): "Acid and Sour Gas Treating Processes", Gulf Publishing Co., Houston/Tex. (1997).

To remove the gases to be separated off, not only physical, but also chemical, scrubbing methods and also hybrid methods are used. This division is in accordance with the physicochemical principles which underlie the application. Absorption is based on the fact that the components of the system comprising a liquid and a gaseous mixture seek a distribution in the two phases which accords to the thermodynamic equilibrium state.

In the case of the physical absorption methods, owing to different specific physical intermolecular interactions, individual gas components are preferentially scrubbed out of the gas mixtures. It is a characteristic of the physical solubility that, with increasing pressure or partial pressure, and constant temperature, for each individual gas a specific, approximately uniform increase of the amount dissolved takes place. The solubility of the absorbed components decreases with temperature.

As physically acting absorbents, in the known methods, use is made of, in addition to others, for example low-temperature methanol, N-methylpyrrolidone, propylene carbonate, 1,3-dimethylpropyleneurea and polyethylene glycol dialkyl ether. In EP-B-0 033 401 and also EP-A-0 124 835, furthermore, methods using N-alkylated diamines are described. DE 195 48 009 A1 describes a physically acting scrubbing medium based on an oligodiamine.

In chemical absorption, the dissolved gas reacts in accordance with the law of mass action in part to virtually completely with the solvent or with a component of a solvent mixture, and it is converted to one or more low-volatility substances which remain in the liquid phase. The most frequent application of chemical absorption is in the dissolution of acid-forming gases in water to which basic additives are added for the effective increase of the dissociation of the slightly acid-reacting electrolytes. The solution process is based on the fact that the electrolytes, that is to say the dissolved acidic gases and the added basic additives dissociate to ions in part to virtually completely, the ions having with the Water an interaction so strong that the liquid phase cannot leave. As additive, use is made in the known methods, in addition to others, for example of potash ($K_2CO_3$), alkanolamines such as mono-, di- or triethanolamine, methyldiethanolamine and diisopropanolamine, or sodium hydroxide. The base content in these scrubbing solutions is customarily between 15 and 60% by weight.

The aqueous solvents comprising tertiary alkanolamines form the transition to the combined or hybrid absorbents, in which the physical solubility portion of a basic solvent is increased by mixing with a physical solvent, the chemical portion decreasing at the same time, for example in mixtures of water, diethanolamine and methanol (Amisol®). The essential features of the hybrid absorbents are the relatively high increase in solubility in the lower partial pressure range, and the thereafter marked increase in solubility with increasing partial pressure. For instance, owing to the presence, for example, of purely physical absorbent components in the hybrid scrubbing medium, organic sulfur compounds can also be scrubbed out, which is possible only with restrictions using purely chemical absorption.

The solubility characteristics determine the field of application of the various scrubbing methods.

Physical scrubbing methods are used at high process pressures and high concentrations of the gas components to be separated off. The scrubbing medium may be regenerated by decreasing the partial pressure, i.e. by expansion or stripping, or by heating. By the physical absorption route, a high degree of purity of the scrubbed gas stream is not sought, because meeting this requirement would pose a high expenditure for regeneration of the scrubbing medium by desorption. For the fine purification, chemical scrubbing may follow at unchanged operating pressure.

Chemical scrubbing methods are used at low process pressures or at low concentrations. The degree of purification in the chemical scrubbing methods is higher that in the physical scrubbing methods. For regenerating the loaded scrubbing medium, use may be made of only desorption by "boiling out" the weakly acidic gases ($CO_2$, $H_2S$, mercaptans) dissolved in weak bases. In the case of a stronger base, or a more strongly base-reacting gas ($SO_2$), the solubility limit for the ion concentration is exceeded and the salt which is precipitating out is ejected. The saturated scrubbing medium is recirculated to the absorption process by introducing it into the unloaded scrubbing medium stream to be fed, which stream replaces the losses of water due to water of crystallization and ejection and the active chemical components consumed.

In the hybrid scrubbing methods, the advantages of physical and chemical scrubbing are combined, so that desorption can also be performed by reducing the partial pressure by pressure expansion or stripping; a second stage for fine purification is unnecessary. Further advantages which may be mentioned are: owing to the presence of purely physical absorbent components, organic sulfur compounds are also scrubbed out, which is possible only with limitations using purely chemical absorption, and the amount of water vapor produced in the desorption process is less than in chemical absorption. As a result, expenditure in terms of apparatus and energy is less with hybrid scrubbing methods.

Starting from these concepts, the object of the present invention is to seek suitable scrubbing liquids which, in the pure state, have a good physical solubility for the acidic gases and which, in solution in water, develop a sufficient chemical solubility, so that the effective resultant solubility of the scrubbing liquid in certain mixing ranges is higher than in the customary combined solvent mixtures, and a sufficient increase in solubility in a large partial pressure range is ensured. At the same time, the scrubbing medium must meet the requirements demanded by the technique—high specific solubility and high selectivity of the component to be scrubbed out compared with the other gas constituents, low vapor pressure, ready regenerability, chemical resistance to all crude gas components and oxygen, thermal stability, low procurement costs, continuous availability—within the context of an efficient and economic optimum solution. It was an object of the present invention to develop a scrubbing medium which substantially satisfies the requirements and which is suitable for reducing the capital and operating costs owing to the use of smaller apparatus and owing to lower energy expenditure.

The invention relates to the use of an absorption liquid for purifying gases from gaseous acidic contaminants, the absorption liquid comprising
A) 0.1 to 100% by weight of one or more amines of the formula I

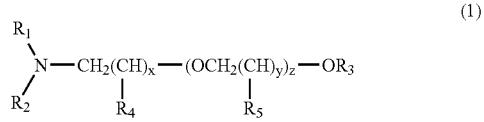

where
$R_1$ is H, $C_1$-$C_6$-alkyl, an aromatic radical having 6 to 18 carbon atoms or a radical of the formula 2

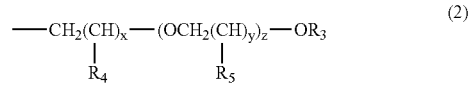

$R_2$ is H, $C_1$-$C_6$-alkyl, an aromatic radical having 6 to 18 carbon atoms or a radical of the formula 3

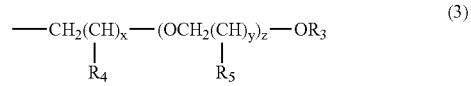

$R_3$ is $C_1$-$C_6$-alkyl or an aromatic radical having 6 to 18 carbon atoms
$R_4$ is H or $CH_3$
$R_5$ is H or $CH_3$
x is a number from 0 to 3
y is a number from 0 to 3
z is an integer between 1 and 30, and also, if appropriate,
B) 0 to 99.9% by weight of water, and/or
C) 0 to 99.9% by weight of any desired solvent.

The absorption liquid comprises one or more polyalkylene glycol amines. In a preferred embodiment of the invention, $R_1$ is —$CH_2CH_2$—($OCH_2CH_2$)$_n$-$OR_3$. In a further preferred embodiment of the invention, $R_2$ is H. In a further preferred embodiment of the invention $R_3$ is methyl. In a further preferred embodiment of the invention x is 1. In a further preferred embodiment of the invention y is 1. In a further preferred embodiment of the invention z is a number between 1 and 4. The inventive absorption liquids can be used not only as individual components, but also in mixtures in any desired mixing ratios.

In a further preferred embodiment of the invention, the inventive polyalkylene glycol ether amines are used together with solvents. Preference as solvents is given to those in which the component A dissolves to at least 0.1% by weight, which do not react chemically with the component A and have a $CO_2$ solubility of $CO_2$ of at least 1.0 m$^3$ (S.T.P.) per m$^3$ of solvent at a partial pressure of 1 bar and 20° C.

Solvents of this type are, for example, alcohols, particularly preferably methanol; pyrrolidones, particularly preferably N-methylpyrrolidone, N-ethylpyrrolidone, N-propylpyrrolidone and other pyrrolidones having a $C_1$ to $C_{12}$ alkyl radical on the nitrogen; propylene carbonate; 1,3-dimethylpropyleneurea; N-formylmorpholine; sulfur heterocycles, particularly preferably sulfolane; alkanolamines having at least one alkyl radical $C_1$ to $C_6$ and at least one $C_1$ to $C_6$ alkanol radical, particularly preferably N,N-diethylethanolamine, N,N-dimethylethanolamine, N-methyldiethanolamine, N-methylethanolamine; amines having at least one $C_1$ to $C_6$ alkanol radical, particularly preferably monoethanolamine, diethanolamine, triethanolamine, diisopropanolamine; hydroxyaminoethyl ethers, mono- and diglycol amines; diamines having an alkyl group between the nitrogen atoms and allyl- and/or hydroxyalkyl radicals, particularly preferably N,N',N'-(trimethyl)-N-(2-hydroxyethyl)ethylenediamine, N,N,N',N'-tetramethylethylenediamine; or polyethylene glycol dialkyl ethers. In a further preferred embodiment of the invention, the content of the amines of the formula 1 is 5 to 99% by weight, in particular 75 to 98% by weight. Water which is present in the hybrid scrubbing methods is preferably present in amounts up to 15% by weight, in particular from 1 to 12% by weight, especially 2 to 10% by weight. The content of the solvents is preferably 1 to 95% by weight, in particular 2 to 25% by weight.

In a further preferred embodiment, the constituents A and C total 100% by weight. In a further preferred embodiment, the constituents A, B and C total 100% by weight.

The gases to be purified can be any desired gases which comprise corresponding contaminants and which do not themselves react with the absorption liquid. The absorption liquid for purifying synthesis gas is particularly suitable. The contaminants which are to be removed by the inventive use are acid-forming and gaseous or vaporous. These are, in particular, $CO_2$, $H_2S$, $SO_2$, $CS_2$, HCN, COS or lower mercaptans having $C_1$-$C_8$ carbon radicals.

The gas scrubbing can be carried out at atmospheric pressure or under pressures between 1 and 110 bar, preferably up to 70 bar. The absorption temperature can be 0 to 100° C., preferably 10 to 40° C. The water vapor present in the crude gases is likewise co-removed in a scrubbing method using the inventive absorption liquids, so that a previous dewatering of the crude gas is not necessary. Desorption of water vapor must be performed appropriately in the regeneration phase. As is customary in physical scrubbing methods, the inventive, loaded absorption liquids are to comprise as little water as possible, preferably between 0 and 15 mol %, since the solubilities of the gases decrease with increasing water content. To hydrolyze COS and $CS_2$ using a hydrolysis promoter, a water content of at least 0.5 mol % is necessary.

The invention further relates to a method for purifying gases by bringing the gases into contact with the inventive absorption liquid at temperatures of 0 to 100° C. and pressures of 1 to 110 bar.

EXAMPLES

The effectiveness of the inventive absorption liquid is demonstrated hereinafter on the basis of experiments which were carried out on a pilot plant.

The solubility values of $CO_2$ determined experimentally in the inventive solvent show that this solvent has a very good dissolving power, as the comparison with polyethylene glycol dimethyl ether shows: in polyethylene glycol dimethyl ether (molar mass of approximately 250 g/mol, trade name ®Genosorb 1753) at 20° C., 3.42 $m^3{}_{CO2}$ (S.T.P.) $m^{-3}{}_{solvent}$ $bar^{-1}{}_{CO2}$, in the inventive solvent at 20° C., 15.2 $m^3{}_{CO2}$ (S.T.P.) $m^{-3}{}_{solvent}$ $bar^{-1}{}_{CO2}$.

On the basis of $CO_2$ solubility measurements in the inventive anhydrous solvent and in its aqueous 7 mol % or 50% strength by weight solution, it may be estimated that the hybrid solubility behavior of the solvent mixture is at 45 to 60 mol %, or 92 to 95% by weight amine content.

Experiments on $CO_2$ Absorption:

A crude synthesis gas produced in a gasification plant (crude gas for short) was passed to the bottom of the absorption column at a pressure of 50 bar and a temperature of approximately 30° C.

The crude gas had the following composition:

| | | |
|---|---|---|
| $CO_2$ | % by volume | 35.5 |
| $H_2$ | % by volume | 56.5 |
| CO | % by volume | 8.0 |

Three experiments were carried out with constant boundary conditions, which experiments were run at different time points using various absorbents. The purpose of the experiments was to show that when the inventive absorption liquid is used, its circulation rate can be reduced compared with the prior art.

Experiment 1 (Comparative Example)

Use is made of a polyethylene glycol dimethyl ether (abbreviation: PEGDME) of a molar mass of approximately 250 (trade name ®Genosorb 1753).

Experiment 2 (Inventive Example)

Use is made of a bis(methyldiethylene glycol ether)amine-water mixture having 85% by weight amine and 15% by weight water in a similar manner to experiment 1.

Experiment 3 (Inventive Example)

Use is made of bis(methyidiethylene glycol ether)amine in a similar manner to experiment 1.

As constant boundary conditions, the following parameters were established:
1. Crude gas rate
2. Crude gas composition
3. $CO_2$ content in the pure gas
4. Temperature of the crude gas at the absorber inlet (32° C.)
5. Temperature of the regenerated solvent at the absorber inlet (17° C.)
6. Stripping vapor ratio of the thermal regeneration As target parameter of the respective experimental arrangement, the circulation of the absorption liquid is determined.

Experimental Results:

The numbers hereinafter are based on statistical data each of which were determined during a relatively long experimental arrangement (at least 8 hours) from online measured values:

| | | Experiment 1 | Experiment 2 | Experiment 3 |
|---|---|---|---|---|
| Crude gas | $m^3$ (S.T.P.)/h | 1000 | 1000 | 1000 |
| $CO_2$ in the crude gas | % by volume | 35.5 | 35.5 | 35.5 |
| $CO_2$ in the pure gas | % by volume | <1 | <1 | <1 |
| Solvent rate | $m^3$/h | 60.3 | 34.6 | 27.1 |

The inventive absorption liquid, under these conditions, permits a reduction of the liquid rate by 42% (experiment 2) and by 55% (experiment 3).

Experiments on $H_2S$ Absorption:

A crude gas produced in a gasification plant was passed to the bottom of the absorption column at a pressure of 24 bar and a temperature of approximately 30° C.

The crude gas had the following composition:

| | | |
|---|---|---|
| $H_2S$ | ppm by volume | 480 |
| $CO_2$ | % by volume | 20.7 |
| $CH_4$ | % by volume | 5.6 |
| $H_2$ | % by volume | 40.7 |
| CO | % by volume | 33.0 |

The $H_2S$ content was set via a metering station.

Three experiments were carried out using constant boundary conditions, which experiments were run at various time points using various absorbents.

Experiment 4 (Comparative Example)

Use is made of a polyethylene glycol dimethyl ether (abbreviation: PEGDME) of a molar mass of approximately 250 (trade name ®Genosorb 1753).

Experiment 5 (Inventive Example)

Use is made of a bis(methyldiethylene glycol ether)amine-water mixture having 85% by weight amine and 15% by weight water in a similar manner to experiment 4.

Experiment 6 (Inventive Example)

Use is made of bis(methyidiethylene glycol ether)amine in a similar manner to experiment 4.

Experimental Results:

The numbers hereinafter are based on statistical data each of which were determined during a relatively long experimental arrangement (at least 8 hours) from online measured values:

|  |  | Experiment 4 | Experiment 5 | Experiment 6 |
|---|---|---|---|---|
| Crude gas | m³ (S.T.P.)/h | 370 | 370 | 370 |
| $H_2S$ in the crude gas | ppm by volume | 480 | 480 | 480 |
| $H_2S$ in the pure gas | ppm by volume | <10 | <10 | <10 |
| Solvent rate | m³/h | 4.4 | 3.4 | 2.8 |

The inventive absorption liquid, under these conditions, permits a reduction of the liquid rate by 23% (experiment 5) and by 36% (experiment 6).

The invention claimed is:

1. A method for purifying a gas comprising gaseous acidic contaminants, said method comprising contacting the gas with an absorption liquid comprising:

A) 0.1 to 100% by weight of one or more amines of the formula 1

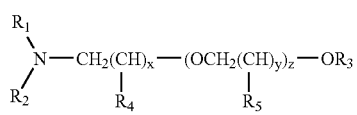
(1)

where $R_1$ is H, $C_1$-$C_6$-alkyl, an aromatic radical having 6 to 18 carbon atoms or a radical of the formula 2

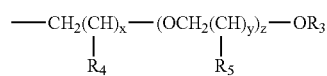
(2)

$R_2$ is H, $C_1$-$C_6$-alkyl, an aromatic radical having 6 to 18 carbon atoms or a radical of the formula 3

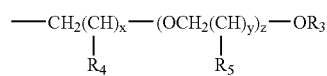
(3)

$R_3$ is $C_1$-$C_6$-alkyl or an aromatic radical having 6 to 18 carbon atoms $R_4$ is H or $CH_3$ $R_5$ is H or $CH_3$ x is a number from 0 to 3 y is a number from 0 to 3 z is an integer between 1 and 30, and from 0 to 99.9% by weight of (B) water or from 0 to 99.9% by weight a solvent (C) or mixtures thereof.

2. The method of claim 1, wherein the constituents A, B and C total 100% by weight.

3. The method of claim 1, wherein $R_1$ is —$CH_2CH_2$—($OCH_2CH_2$)$_n$-$OR_3$.

4. The method of claim 1, wherein $R_2$ is H.

5. The method of claim 1, wherein $R_3$ is methyl.

6. The method of claim 1, wherein x=1.

7. The method of claim 1, wherein y=1.

8. The method of claim 1, wherein z is an integer between 1 and 4.

9. The method of claim 1, wherein the gas is a synthesis gas.

10. The method of claim 1, wherein said contacting occurs at a pressure of 1 to 110 bar and a temperature of 0 to 100° C.

11. A composition comprising

A) 5 to 98% by weight of one or more amines of the formula (1)

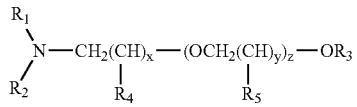
(1)

where $R_1$ is H, $C_1$-$C_6$-alkyl, or an aromatic radical having 6 to 18 carbon atoms or a radical of the formula (2)

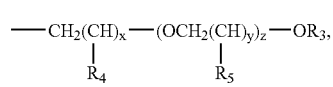
(2)

$R_2$ is H, $C_1$-$C_6$-alkyl, or an aromatic radical having 6 to 18 carbon atoms or a radical of the formula (3)

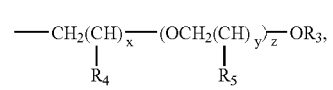
(3)

$R_3$ is $C_1$-$C_6$-alkyl or an aromatic radical having 6 to 18 carbon atoms $R_4$ is H or $CH_3$ $R_5$ is H or $CH_3$ x is a number from 0 to 3 y is a number from 0 to 3 z is an integer between 1 and 30, and also

B) 1 to 12% by weight of water, and/or

C) 1 to 95% by weight of a solvent.

12. The method of claim 1, wherein the absorption liquid comprises water in an amount up to 15 weight percent based on the absorption liquid.

13. The method of claim 1, wherein the absorption liquid comprises solvent in an amount from 1 to 95 weight percent based on the absorption liquid.

14. The method of claim 1, further comprising regenerating the absorption liquid.

15. The method of claim 14, wherein the regenerating step includes removal of water.

16. The method of claim 1, wherein the gaseous acidic contaminants are selected from the group consisting of $CO_2$, $H_2S$, $SO_2$, $CS_2$, HCN, COS, lower mercaptans having $C_1$ to $C_8$ carbon radicals, and mixtures thereof.

* * * * *